April 13, 1943.  R. H. OSBRINK  2,316,279
APPARATUS FOR MANUFACTURING MOLD MEMBERS
Filed March 30, 1942  2 Sheets-Sheet 1
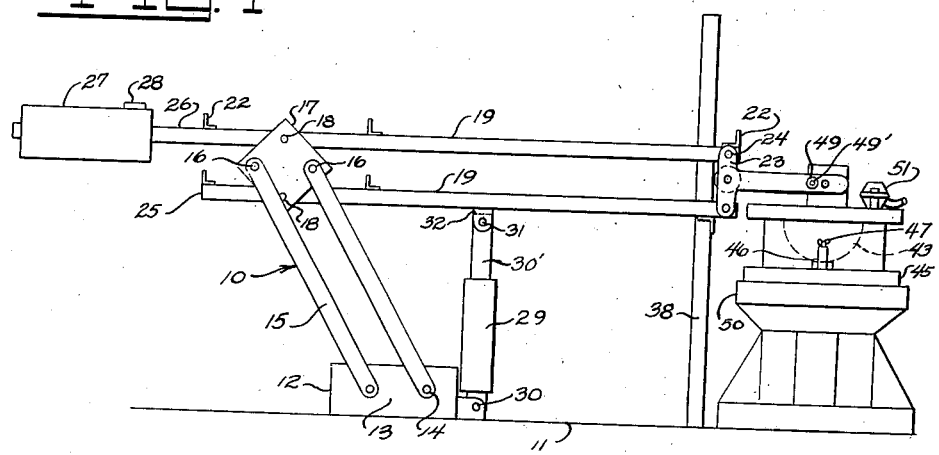
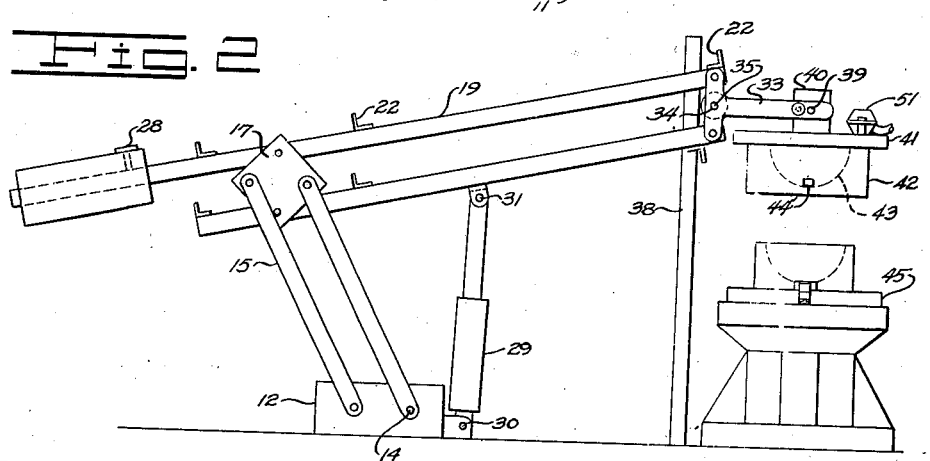
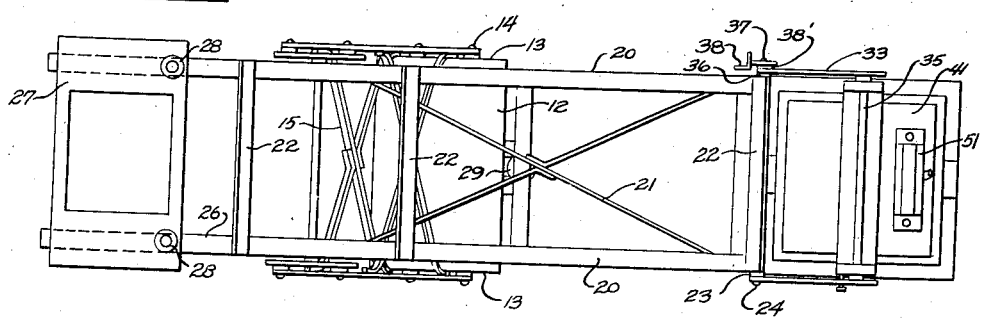
INVENTOR.
R. H. OSBRINK
BY
ATTORNEY

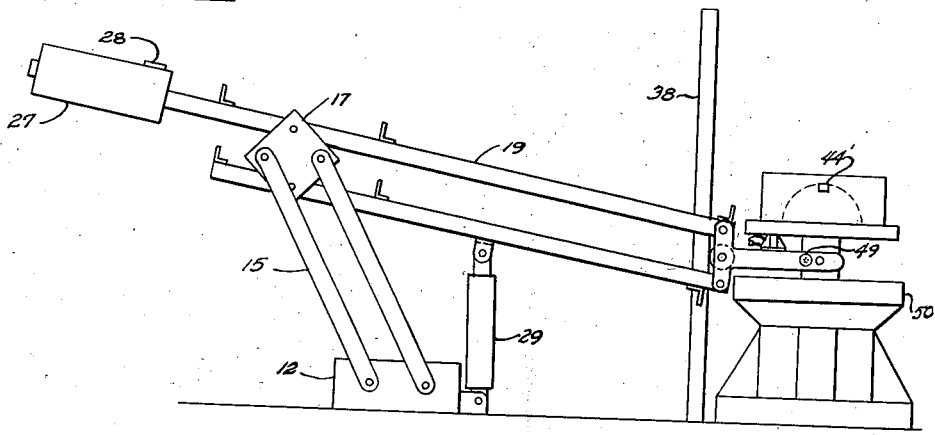
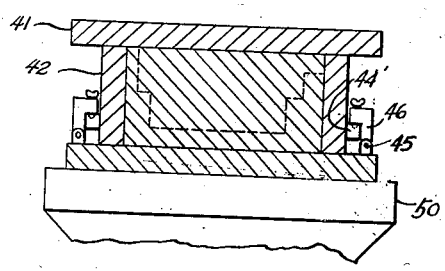
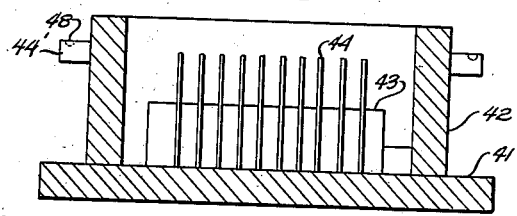
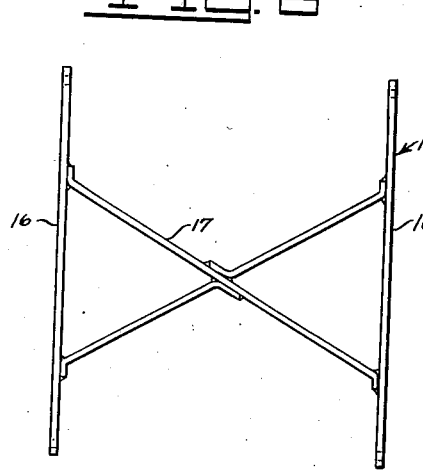
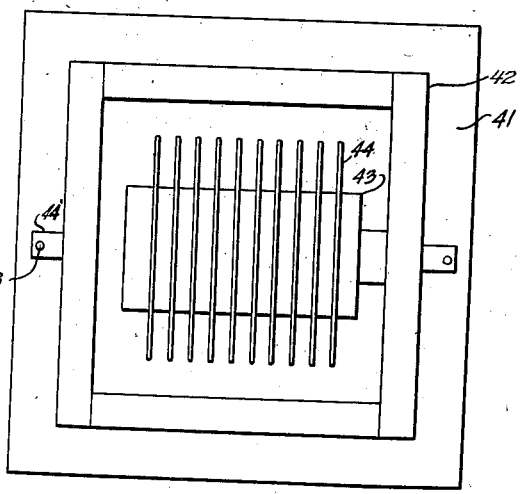
INVENTOR.
R. H. OSBRINK
ATTORNEY Patented Apr. 13, 1943

2,316,279

UNITED STATES PATENT OFFICE 2,316,279

APPARATUS FOR MANUFACTURING MOLD MEMBERS

Raymond H. Osbrink, Los Angeles, Calif.

Application March 30, 1942, Serial No. 436,744

6 Claims. (Cl. 22—47)

This invention relates to an apparatus for the manufacture of mold members.

The general object of my invention is to provide a novel apparatus for the accurate manufacture of mold members which are employed in foundry work.

A specific object of my invention is to provide a novel apparatus for moving a pattern from a mold member without tilting the pattern during such movement.

A more specific object of my invention is to provide an apparatus wherein novel means is provided for simultaneously vibrating and withdrawing a pattern and a mold flask from a mold member.

An additional object of the invention is to provide means for supporting a platen for movement about the axis of a shaft and wherein novel means is provided for moving the shaft axis in a single plane.

An additional object of this invention is to provide a mold member making apparatus including a vertically shiftable piston and novel link members operable by the piston for moving a mold flask support member vertically.

Another object of this invention is to provide a parallel link operated apparatus for moving a pattern from a mold member.

Other objects and advantages of the invention will be apparent from the following description taken in connection with the accompanying drawings wherein:

Fig. 1 is a side elevation of an apparatus embodying the features of my invention;

Fig. 2 is a view similar to Fig. 1 showing the mold flask raised;

Fig. 3 is a top plan view of the apparatus;

Fig. 4 is a view similar to Fig. 1 with the mold flask inverted;

Fig. 5 is a fragmentary side elevation partly in section showing the jolt table with the mold flask thereon;

Fig. 6 is a longitudinal section through the mold flask;

Fig. 7 is a top plan view of the mold flask; and

Fig. 8 is a plan view of an X frame member.

Referring to the drawings by reference characters I have shown my invention as embodied in an apparatus which is indicated generally at 10. As shown the apparatus is arranged on a base 11 and includes a support 12. The support 12 is provided with opposed sides 13. On each opposed side 13 I arrange a pair of pivot members 14. The axes of all of the pivot members 14 are disposed in a single horizontal plane.

Each pair of opposed pivots 14 support an X frame 15. Each X frame includes opposed side members 16 and an X-shaped cross member 17 suitably secured to the side members. The upper ends of the frames 15 are connected by pivot members 16 to spaced plates 17. The frame members are of equal length and the axes of the pivot 16 are horizontal so that a parallel link motion is provided.

Each of the plates 17 is provided with a pair of pivots 18. These pivots 18 are vertically aligned and pivotally support upper and lower X frames 19. Each X frame 19 includes sides 20 and a cross member 21 suitably secured to the side members 20. The cross members 20 are further connected by transverse members 22 disposed in the front of and in the rear of the pivots 18. The forward end of the sides 20 of the frames 19 are connected to end links 23 by pivot members 24. The pivot members 24 are vertically aligned and the frame members 19 are parallel so that these frame members form a parallel link motion.

The lower frame 19 terminates at 25 slightly in the rear of the plates 17, while the upper frame 19 is extended as at 26 and slidably supports a counterweight 27 which is held in place by a pair of set screws 28 which pass through the counterweight and engage the adjacent members 20.

Between the plates 17 and the link 23 I show a cylinder 29 which is pivoted as at 30 on the base 11 and which has a piston 30' therein. The piston 30' at its upper end pivotally engages at 31 a cross member 32 which connects the side members 20 of the lower frame 19.

Each end link 23 is provided with a forwardly extending arm 33 which is shown as integral with the link. The end links are provided with aligned apertures 34 through which a shaft 35 extends. The shaft 35 is provided with washers 36 between the end links and the side members 20 at one end and the shaft 35 projects beyond the link 23 and is provided with a roller 37 which engages a fixed vertical guide 38 mounted on the base 11. A washer 36' is arranged between the roller 37 and the adjacent end link 23.

The construction described is such that when the arm 33 is moved vertically the roller 37 will roll along the guide 38 and the axes of the pivots 24 will remain in vertical alignment due to the construction of the parallel link motion members.

The arms 33 include pivots 39 which engage a bracket 40 on the base 41 of a mold flask 42. A pattern 43 is disposed within the mold flask and as shown the pattern includes a plurality of vane members 44.

The mold flask is provided with projecting tongues 44' upon each end and in use the mold flask is employed with a pallet 45 provided with pivoted clamping members 46. The clamping members 46 engage the tongues 44' and include thumb screws 47 the lower ends of which fit in recesses 48 in the tongues 44'.

A clamping member 49 includes a shank member 49' which engages the bracket 40 to hold the mold flask in either of its two positions.

In use the parts are moved to the position shown in Fig. 4, and sand is placed in the inverted mold flask. The projection 40 rests on a jolt table 50 which may be of any desired construction. A jolt table is shown and described which may be employed in my pending application, Serial Number 420,097, filed November 22, 1941. The jolt table is then operated by means not shown and the sand is compacted in the flask about the pattern. The pallet 45 is then placed upon the top of the flask and the clamping members 46 are secured in place. The cylinder 29 is then actuated by means not shown and the flask and pallet are raised. The clamping member 49 is then released and the mold flask is swung through 180 degrees so that the pallet rests on the jolt table as shown in Fig. 5. The clamps 46 are then released and a vibrator 51 shown as arranged on the mold flask is then operated to vibrate the pattern. While the pattern and mold flask are being vibrated, the cylinder 29 is operated thus causing the mold flask and pattern to move vertically so that the pattern moves from the mold in a straight line whereby a smooth accurate mold member is produced.

From the foregoing description it will be apparent that I have invented a novel apparatus for the manufacture of mold members which can be economically manufactured and which is highly efficient in use.

Having thus described my invention, I claim:

1. In an apparatus for removing a pattern from a mold member, a base, a pair of parallel link motion arms each having one end pivotally engaging said base, a plate pivotally connecting the other ends of said arms, a second pair of parallel link motion arms each having one end pivotally engaging said plate, means to guide one end of said second pair of parallel link motion arms for movement in a single plane, means to move said second pair of parallel link motion arms, and a pattern mounted on said second pair of parallel link motion members and remote from said plate.

2. In an apparatus for removing a pattern from a mold member, a base, a pair of spaced parallel link motion arms each having one end pivotally engaging said base, a plate pivotally connecting the other ends of said arms, a second pair of parallel link motion arms each having one end pivotally engaging said plate, link means connecting the other end of said second pair of parallel link motion members, a flask pivotally mounted on said link means, a pattern in said flask and means to guide said link means in a vertical plane when the parallel link motion members are removed.

3. In an apparatus for making a mold member, a base, a pair of parallel link motion arms each arm having one end pivotally engaging said base, a plate pivotally connecting the other ends of said arms, a second pair of parallel link motion arms each having their rear ends pivotally mounted on said plate, a flask pivotally mounted on the front ends of said second pair of parallel link motion arms, a pattern in said flask and means at the front end of said second pair of parallel link motion arms to guide the forward ends of said second pair of parallel link motion arms in a vertical plane when the parallel link motion members are moved.

4. In an apparatus for removing a pattern from a mold flask, a base, a support on said base, said support having spaced sides, a pair of spaced shafts on each side of said support, a link mounted on each shaft, said links being of equal lengths and being arranged in parallel pairs, a plate, means pivotally connecting the upper end of each pair of links to said plate, the axes of said pivot means being in alignment, a pair of vertically aligned shafts connected to each plate, a second pair of links mounted at one end thereof on said vertically aligned shafts, said second links being parallel, coplanar and spaced apart, end links pivotally connecting the other ends of said second links, said end links being coplanar, a counterweight slidably mounted on said one end of said second links, an arm on said end links and projecting beyond the end links, a roller rotatably mounted on said end links, a guide member on said base and engaging said roller, and a pattern on said arm.

5. In an apparatus for removing a pattern from a mold flask, a base, a support on said base, said support having spaced sides, a pair of spaced shafts on each side of said support, a link mounted on each shaft, said links being of equal length and being arranged in parallel pairs, a plate, means pivotally connecting the upper end of each pair of links to said plate, the axes of said pivot means being in horizontal alignment, a pair of vertically aligned shafts connected to each plate, a second pair of links mounted at one end thereof on said vertically aligned shafts, said second links being parallel, coplanar and spaced apart, end links pivotally connecting the other ends of said second links, said end links being coplanar, a counterweight slidably mounted on said one end of said second links, a horizontal arm on said end links and projecting beyond the end links, a roller rotatably mounted on said end links, a vertical guide member on said base and engaging said roller, a flask pivotally mounted on said horizontal arm and a pattern in said flask.

6. In an apparatus for removing a pattern from a mold flask, a base, a support in said base, a pair of X frames pivotally mounted on said support, said frames being spaced apart and being parallel and of equal length, a pair of spaced plates, means pivotally connecting the upper end of each of said frames to said plates, the axes of said pivots being horizontally aligned, a second pair of X frames pivotally mounted on said plates, said second pair of X frames being of equal length, the axis of said last mentioned pivots being vertically aligned, parallel end link members pivotally connecting the forward ends of said second pair of frame members, the axes of said end link member pivots being vertically aligned, a horizontal arm projecting forwardly from each end link member, a shaft on said end, a roller rotatably mounted on said shaft, a fixed vertical guide on said base and engaging said roller, a flask pivotally mounted on said horizontal arms, a pattern in said flask, piston means for shifting said second pair of X frame members and a counterweight mounted on the rear end of one of said second mentioned X members.

RAYMOND H. OSBRINK.